US006631937B2

(12) United States Patent
Miyakawa et al.

(10) Patent No.: US 6,631,937 B2
(45) Date of Patent: Oct. 14, 2003

(54) SOUNDPROOFING COVER FOR VEHICLE

(75) Inventors: Shinji Miyakawa, Ichinomiya (JP); Michio Ito, Inuyama (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 09/900,047

(22) Filed: Jul. 9, 2001

(65) Prior Publication Data

US 2002/0134600 A1 Sep. 26, 2002

(30) Foreign Application Priority Data

Mar. 22, 2001 (JP) ....................................... 2001-082563
Apr. 26, 2001 (JP) ....................................... 2001-129993

(51) Int. Cl.$^{7}$ ................................................ B60R 13/08
(52) U.S. Cl. ...................... 296/39.3; 296/39.1; 181/284
(58) Field of Search .............................. 296/39.3, 39.1; 180/69.22, 232; 181/200, 210, 284

(56) References Cited

U.S. PATENT DOCUMENTS 3,882,951 A * 5/1975 Conley ........................ 180/64
4,048,366 A * 9/1977 Kingsbury .................. 428/215
4,420,062 A * 12/1983 Fukushima ................. 181/204
4,456,092 A * 6/1984 Kubozuka et al. .......... 181/290
4,823,909 A * 4/1989 Nakamura et al. .......... 181/290
4,932,496 A * 6/1990 Lammers .................... 181/290
4,996,095 A * 2/1991 Behdorf et al. ............. 428/215
5,196,253 A * 3/1993 Mueller et al. ............. 428/138
5,213,391 A * 5/1993 Takagi ........................ 296/205
6,062,624 A * 5/2000 Crabtree et al. ........... 296/39.3
6,123,172 A * 9/2000 Byrd et al. ................. 180/290
6,227,606 B1 * 5/2001 Schroeder et al. ....... 296/146.1

FOREIGN PATENT DOCUMENTS

JP 10-205352 8/1998
JP 2000-230431 8/2000

* cited by examiner

*Primary Examiner*—Joseph D. Pape
*Assistant Examiner*—Greg Blankenship
(74) *Attorney, Agent, or Firm*—Oblon, Spivak, McClelland, Maier & Neustadt, P.C.

(57) ABSTRACT

A soundproofing cover absorbs noises, produced by a vehicle. It is fastened to a plurality of vehicle-side installation portions, and includes a cover body, composed of a polymer foamed substance, and a plurality of brackets, held integrally to the cover body. The respective brackets have an installation portion and a holding portion. The installation portion is to be fastened to the vehicle-side installation portions. The holding portion is held and fastened integrally to the cover body. At least two of the installation portions constitute a datum bracket, connected by one of the holding portions shared commonly. The positioning accuracy can be improved in the installation of the soundproofing cover to the vehicle-side installation portions so that the installation operability can be upgraded. In addition, the increment of the weight can be kept minimum so that the lightweighting requirement can be satisfied.

6 Claims, 3 Drawing Sheets

SOUNDPROOFING COVER FOR VEHICLE

BACKGROUND OF THE INVENTION

1. Field of the Invention

The present invention relates to a soundproofing cover, which can inhibit noises from generating by absorbing noises produced by an engine of an automobile, and the like.

2. Description of the Related Art

In recent automobiles, an engine cover is disposed in order to seal the noises, which are produced by the engine, and to upgrade the fine appearance in the engine room. This engine cover, for example, as disclosed in Japanese Unexamined Patent Publication (KOKAI) No. 10-205,352, is constituted by a hard sound sealing layer, which is composed of a resin or steel plate, and sound absorbing layer, which is laminated on an engine-side surface of the sound sealing layer and which is composed of a polymer foamed substance. In the engine cover, the sound sealing layer seals the sounds, which are produced by the engine, and upgrades the exterior appearance. Then, the sound absorbing layer absorbs the sounds, which are produced by the engine.

However, since the sound sealing layer is formed as a hard plate shape, there arises a problem in that the sound sealing layer becomes the generating source of the sounds when the sound sealing layer itself vibrates. Accordingly, the sound absorbing layer inhibits the sound waves from reaching the sound sealing layer and inhibits the sound sealing layer from vibrating. In addition, the engine cover is fastened to an engine or adjacent to the engine by way of a vibration-proofing component member, such as a rubber mount, etc. With such an arrangement, the vibrations of the engine are inhibited from transmitting to the sound sealing layer.

Since the foamed urethane, which has been used widely as the polymer foamed substance, exhibits the independent porosity rate as low as a couple of percentages, it is extremely good in terms of the sound absorbing characteristic. However, the foamed urethane has a problem in that it shows a low sound sealing characteristic. In addition, in order to have the sound sealing layer exhibit a sufficient sound sealing characteristic, it is necessary to give it a large mass of certain extent with respect to a unit surface area of the sound sealing layer. Thus, the weight of the sound sealing layer has enlarged inevitably, and accordingly has resulted in the outcome against the lightweight requirement.

Hence, in Japanese Unexamined Patent Publication (KOKAI) No. 2,000-230,431, there is disclosed a soundproofing cover, which includes a polymer foamed substance with an increased independent porosity rate and whose surface is exposed. In accordance with the thus constructed soundproofing cover, it is possible to coexist the sound absorbing characteristic with the sound sealing characteristic by the polymer foamed substance only. Namely, since the independent porosity rate is high, the transmitting sounds are reduced to exhibit the sound sealing characteristic, the sound sealing layer can be obviated and the lightweighting can be achieved. Moreover, since the sound absorbing layer is exposed, it is possible to absorb the reflective sounds in the engine room. In addition, since the polymer foamed substance is soft, and since its surface is formed as a rough surface having open pores, it does not produce the sounds even if it vibrates.

By the way, when installing a soundproofing cover, like the one which is disclosed in Japanese Unexamined Patent Publication (KOKAI) No. 2,000-230,431, to a mating component member, such as an engine, and so on, it is possible to fasten it by way of a separate component member. However, it is desirable, when forming the polymer foamed substance, to carry out insert molding so that a plurality of brackets protrude from the resulting polymer foamed substance, and to fasten the soundproofing cover to a plurality of portions of the mating component member to be installed to the soundproofing cover by way of a bolt hole, and the like, of the brackets, which project from the polymer foamed substance. With this arrangement, since the entire surface of the polymer foamed substance is exposed, it is possible to inhibit the impairment of the sound sealing characteristic, which is caused by exposing a hard material. Hence, in the technique disclosed in the aforementioned publication, a plurality of brackets are made integral with the polymer foamed substance independently of each other.

However, in the soundproofing cover, the polymer foamed substance is insufficient in terms of the rigidity so that the configuration is not stabilized. Even when the sound proofing cover has high dimensional accuracy, there arises a problem in that the positioning operability is low as it is installed to the mating component member.

Therefore, it is possible to think of connecting all of the brackets. With this arrangement, the rigidity can be secured by the brackets. Accordingly, the positioning operability can be improved by making a soundproofing cover with high dimensional accuracy.

However, it is not always the case that a plurality of the portions of the mating component member to be installed to the soundproofing cover are on an identical mating component member. For instance, there is a case that the soundproofing cover is fastened over an engine body and an intake manifold. In such a case that the portions to be installed to the soundproofing cover are present on a plurality of mating component members, it cannot necessary say that the mutual positioning accuracy between the mating component members is high. There even arises a case that the mutual dimensional accuracy of the respective portions to be installed to the soundproofing cover is low. Hence, even when the soundproofing cover is made highly accurate dimensionally by connecting a plurality of the brackets, there arises a case that the installation operability cannot necessary be high, and that the installation operability may rather be lowered instead. It is rather desirable to make a plurality of the brackets independently of each other and to install the soundproofing cover by partially expanding or contracting the polymer foamed substance. However, due to the lack of the rigidity, it is not possible to improve the problems that it is difficult to carry out the positioning, and that the soundproofing cover is inferior in terms of the installation operability. In addition, since the brackets are usually made of a metal, it is needed to decrease the usage amount as less as possible in order to satisfy the lightweighting requirement.

SUMMARY OF THE INVENTION

The present invention has been developed in view of the aforementioned circumstances. It is an object of the present invention, in a soundproofing cover which is free from a hard sound sealing layer, to improve the positioning accuracy in the installation of the soundproofing cover to the portions of a vehicle to be installed thereto, and to satisfy the lightweighting requirement.

A soundproofing cover for a vehicle according to the present invention can carry out the object set forth above. It absorbs noises, which are produced by a vehicle, is fastened to a plurality of portions of the vehicle to be installed to the soundproofing cover, and comprises: a cover body composed of a polymer foamed substance; a plurality of brackets held integrally to the cover body; and the respective brackets having an installation portion to be fastened to the portions of the vehicle to be installed to the soundproofing cover and a holding portion held and fastened integrally to the cover body, and at least two of the installation portions constituting a datum bracket connected by one of the holding portions shared commonly.

Namely, in accordance with the soundproofing cover of the present invention, the positioning accuracy can be improved in the installation of the present soundproofing cover to the portions of the vehicle to be installed thereto so that the installation operability can be upgraded. In addition, the increment of the weight can be kept minimum so that the lightweighting requirement can be satisfied.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
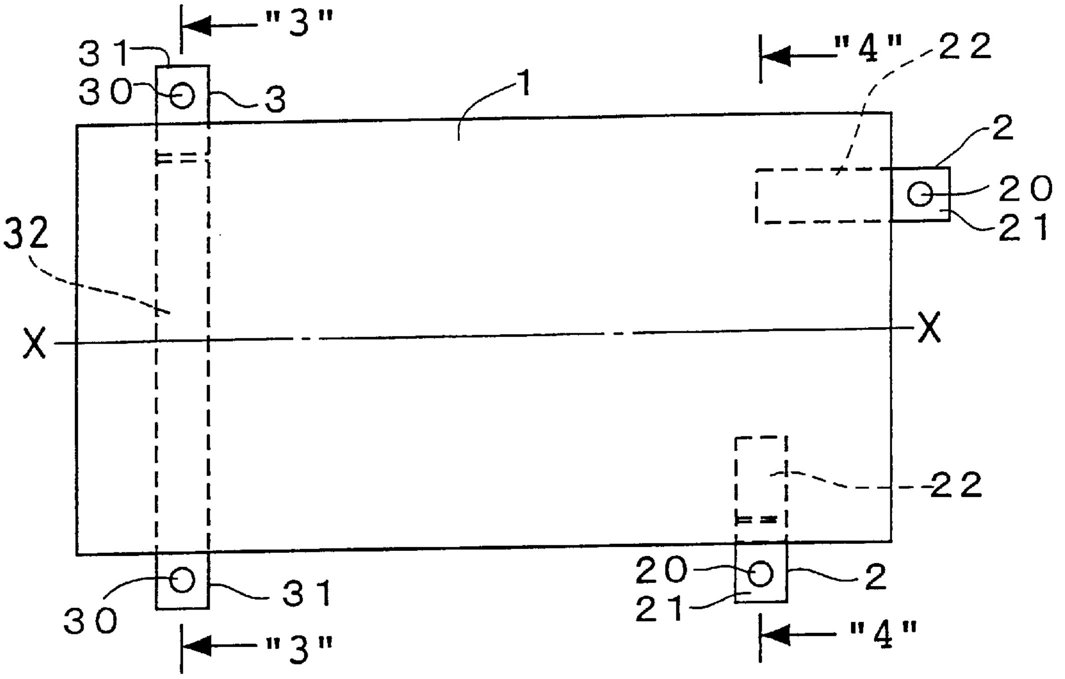
FIG. 1 is a plan view of Example No. 1 of a soundproofing cover according to the present invention.

Having generally described the present invention, a further understanding can be obtained by reference to the specific preferred embodiments which are provided herein for the purposes of illustration only and not intended to limit the scope of the appended claims.

In a soundproofing cover according the present invention, respective brackets have an installation portion and a holding portion, and at least two of the installation portions constitute a datum bracket, which is connected by one of the holding portions shared commonly. The holding portion will be hereinafter referred to as the "commonly-shared holding portion". Namely, in the datum bracket, since at least two of the installation portions are made integral by the commonly-shared holding portion, the rigidity of the cover body is enhanced at the portion, where the commonly-shared holding portion is present. Therefore, when the installation portions of the datum bracket are installed to portions of a vehicle to be installed to the present soundproofing cover, the positioning can be carried out with ease so that the installation operability can be improved. The portions of a vehicle to be installed to the present soundproofing cover will be hereinafter referred to as the "vehicle-side installation portions". In addition, when the datum bracket is first installed to two of the vehicle-side installation portions, the cover body is fastened to the vehicle-side installation portions by the two installation portions and the commonly-shared holding portion, which connects the two installation portions. Accordingly, the other brackets can also be readily installed to the other vehicle-side installation portions. Namely, by first fastening the datum bracket, the datum bracket becomes a datum, which determines the positions for installing the other brackets.

The more the number of the installation portions of the datum bracket increases, the more the volume of the holding portion enlarges. Hence, the datum bracket can preferably be arranged to have two or three installation portions. When the number of the installation portions is two, the commonly-shared holding portion can be formed as a linear shape or a curve shape. The cover body can secure the rigidity by the commonly-shared holding portion. The increment of the weight can be suppressed minimum.

For instance, the commonly-shared holding portion of the datum bracket can pass adjacent the center line in the thickness-wise direction of the cover body. With this arrangement, the datum bracket functions as a core member so that the rigidity is enhanced in the central portion of the cover body. Accordingly, the central portion of the cover body can be fastened stably with high positioning accuracy by first fastening the datum bracket to the vehicle-side installation portions. In addition, since the central portion is fastened to become a datum, the other brackets can be readily installed to the other vehicle-side installation portions.

Moreover, the commonly-shared holding portion of the datum bracket can preferably cross the center line of the cover body. The center line herein means either one of the two center lines, which extend in the right-and-left direction and the top-and-bottom direction, respectively, when the present soundproofing cover is installed. With this arrangement, the entire cover body can be fastened stably with high positioning accuracy by first fastening the installation portions at the opposite ends disposed with respect to the center line, which the commonly-shared holding portion crosses, to a mating component member.

For example, the holding portion of the datum bracket can be constituted so that it runs along an upper side of the cover body. In this case, when the datum bracket is first fastened to the vehicle-side installation portion, the cover body is put into a state in which it is hung down from the upper side fastened at the datum position. Thus, the other brackets can be installed with ease.

Therefore, the vehicle-side installation portions, to which at least two of the installation portions of the datum bracket are fastened, can preferably be formed on an identical mating component member. With this arrangement, the mutual relationships between the vehicle-side installation portions can be formed with high accuracy. Thus, by upgrading the dimensional accuracy of the datum bracket in advance, the installation portions can be positioned with respect to the vehicle-side installation portions with high accuracy and can be fastened thereto.

The respective brackets, excepting the datum bracket, can preferably be disposed independently of each other. With this arrangement, even when a surface of a mating component member, which is constituted by a plurality of the vehicle-side installation portions, has a complicated shape, which is formed as a three dimensional configuration, it is possible to readily fasten the other brackets to the other vehicle-side installation portions by deforming the cover body while putting the datum bracket into a fastened state to the vehicle-side installation portions. In addition, even when a plurality of the vehicle-side installation are disposed separately on a plurality of mating component members, and even when their positioning accuracy is low, it is possible to readily fasten the other brackets to the other vehicle-side installation portions by deforming the cover body while putting at least two of the installation portions of the datum bracket into a fastened state to the vehicle-side installation portions.

The material of the cover body is not limited in particular as far as it is a polymer foamed substance. It is possible to use a urethane foamed substance or a rubber foamed substance. Among them, it is preferable to use a polymer foamed substance whose independent porosity rate falls in a range of from 8 to 10%. By increasing the independent porosity rate, the transmitting sounds are reduced to be able to reveal the sound sealing characteristic, and the sound sealing layer is obviated to be able to achieve the light-weighting. In addition, since the sound absorbing layer is exposed, it is possible to absorb the reflective sounds in the engine room. Since the cover body is a polymer foamed substance, no sounds are generated even if it vibrates. In particular, when the cover body has a thickness exceeding 50 mm partially, it is possible to balance the sound absorbing characteristic and the sound sealing characteristic by making a cover body from a polymer foamed substance whose independent porosity rate falls in the range of from 8 to 10%. When the independent porosity rate is less than 8%, the sound sealing characteristic degrades. When the independent porosity rate exceeds 10%, the sound absorbing characteristic degrades. In addition, it is preferable to laminate foamed substances whose independent porosity rates differ with each other in a layered manner.

This cover body can preferably be molded into a predetermined shape, which conforms to the configurations of the vehicle-side installation portions. Depending on the situations, it is possible to cut a plate-shaped polymer foamed substance and to use the resulting cut pieces.

The brackets and the datum bracket can be made of a metal, such as iron, copper and aluminum, an alloy, such as a steel, an aluminum alloy and a copper alloy, or can be made from a variety of resinous materials. As described above, the brackets and the datum brackets include the installation portion, which is fastened to the vehicle-side installation portions, and the holding portion, which is held and fastened integrally to the cover body. Depending on the means to be fastened to the vehicle-side installation portions, the shape of the installation portion can be formed as a variety of configurations. For instance, when the installation portions are fastened by using a bolt, a clip, etc., the installation portion is formed as a configuration, which has a bolt hole, a clip hole, etc. In addition, the installation portion can be formed as a configuration, which has a letter "U"-shaped cross section, so that it engages with and fastened to plate-shaped vehicle-side installation portions.

Moreover, the holding portions are portions, which are held by the cover body. It is preferable to take measures in order to inhibit them from coming off from the cover body, for example, by subjecting them to knurling, by forming a pawl on them, and so on. There are the following methods to hold and fasten the holding portions to the cover body. For instance, a fastening method in which the holding portions are fitted into the cover body, a bonding method in which they are bonded to the cover body, an integrally molding method in which they serve as the inserts in the molding of the cover body, and the like. When carrying out the integrally molding method, it is preferable to form the holding portions at least from a material, which can be bonded to a material of the cover body. For example, when the cover body is composed of a foamed urethane, the cover body and the brackets can be bonded integrally by first placing the brackets, which are composed of a steel plate subjected to cation electrodeposition coating on the bonding portion at least, a steel plate coated by an adhesive on the bonding portion at least, etc., in a mold, and then by carrying out foaming molding in the mold.

It is desired that the datum bracket is arranged to have two or three installation portions as set forth above. When the installation portion is provided in a quantity of two, it is desired that the commonly-shared holding portion is formed as a linear shape or a rod shape as described above. When the installation portion is provided in a quantity of 3 or more, it is desired that the installation portions are formed as a trunk portion at the opposite ends, and at the same that a branch portion, which extends from the trunk portion, is formed and is provided with an installation portion at the leading end. With this arrangement, the commonly-shared holding portion can be formed as a linear shape or a rod shape. Thus, the rigidity can be secured with a minimal volume, and at the same time the increment of the weight can be suppressed.

In addition, as for the locations where the present soundproofing cover is placed, it is possible to list the location running along the surface of an engine, the location between an engine and an intake manifold, the location under an engine, an injection pump, and so on. As for the vehicle-side installation portions, it is possible to exemplify the bolt holes, the installation brackets, etc., which are formed in an engine itself, an intake manifold, a vehicle body, and the like.

The present invention will be hereinafter described in detail with reference to specific examples.

EXAMPLE NO. 1

Figure 2:
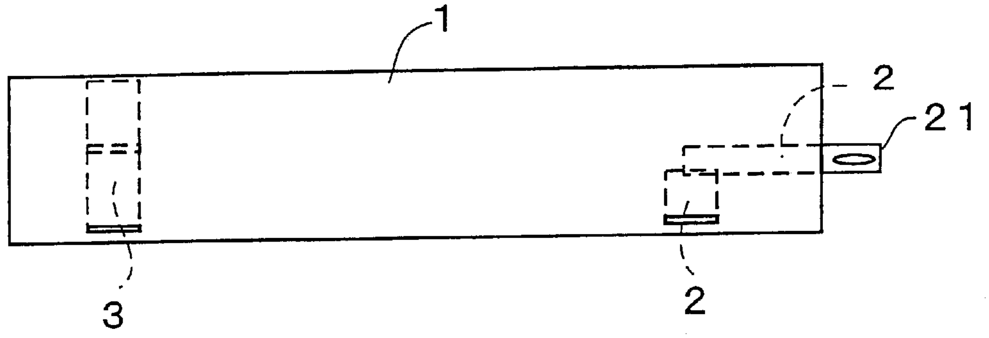
FIG. 2 is a front view of Example No. 1 of a soundproofing cover according to the present invention.
Figure 3:
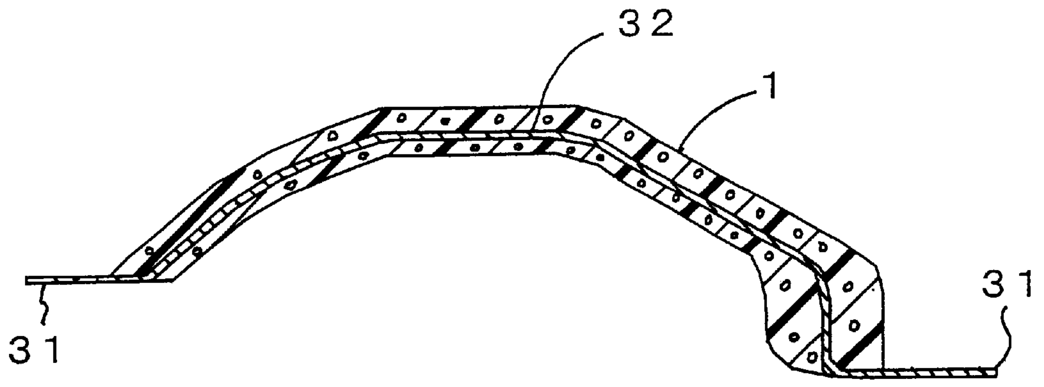
FIG. 3 is a cross sectional view taken along the arrows "3"—"3" of FIG. 1.
Figure 4:
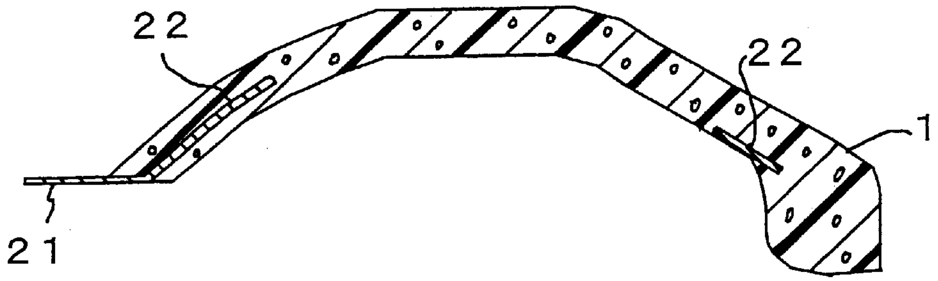
FIG. 4 is a cross sectional view taken along the arrows "4"—"4" of FIG. 1.

A plan view of Example No. 1 according to the present soundproofing cover is illustrated in FIG. 1. The front view thereof is illustrated in FIG. 2. The cross sectional view thereof taken along the arrows "3"—"3" of FIG. 1 is illustrated in FIG. 3. The cross sectional view thereof taken along the arrows "4"—"4" of FIG. 1 is illustrated in FIG. 4.

This soundproofing cover is placed between an engine and an intake manifold to absorb the noises. It comprises a cover body 1, two independent brackets 2 and a datum bracket 3.

The cover body 1 is made from a urethane foamed substance whose independent porosity rate falls in the range of from 8 to 10%, and is formed as a substantially plate shape whose cross section has a curved configuration. In the cover body 1, there exist portions, whose thickness exceeds 50 mm, partially. The independent brackets 2 are made of a punched-out steel plate, and are formed as a substantially letter "L"-shape and a substantially letter "I"-shape, respectively. They are provided with an installation portion 21, which has a bolt hole 20, at one of the opposite ends, and a holding portion 21, which is buried in the cover body 1, at the other one of the opposite ends. Thus, the installation portions 21 protrude from the cover body 1.

Figure 5:
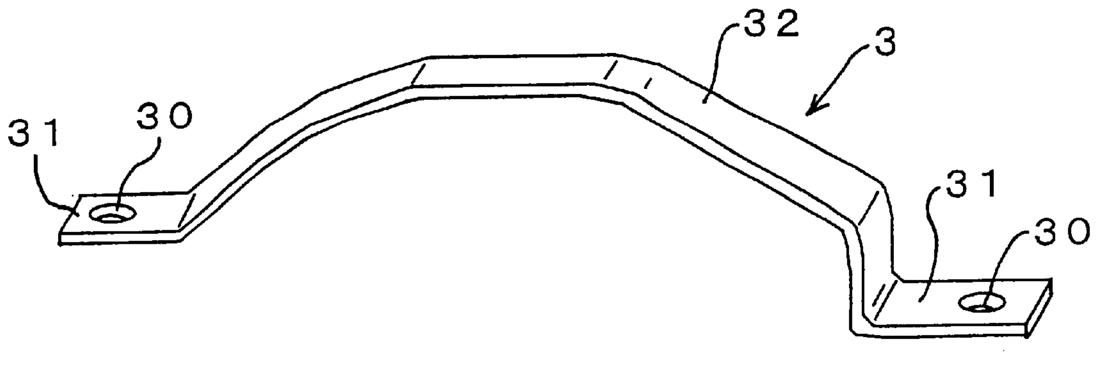
FIG. 5 is a perspective view of a datum bracket, which is used in Example No. 1 of a soundproofing cover according to the present invention.

Then, as illustrated in FIG. 5, the datum bracket 3 is made of a punched-out plate, and is processed to such a shape that it conforms to the cross section taken along the arrows "3"—"3" of FIG. 1. In the datum bracket 3, there are formed installation portions 31, which have a bolt hole 30, at the opposite ends. A commonly-shared holding portion 32 connects the installation portions 31. In addition, as illustrated in FIG. 1, the commonly-shared holding portion 32 is buried in the left end of the cover body 1, and crosses the center line "X"—"X", which extends in the right-and-left direction in FIG. 1. The installation portions 31, disposed at the opposite ends of the datum bracket 3, protrude from the cover body 1 in the top-and-bottom direction, respectively.

The independent brackets 2 as well as the datum bracket 3 are made of a punched-out steel plate. On their surfaces, there is formed a cation electrodeposition coating, respectively. The holding portions 22, 32 are placed in a mold, respectively, and the cover body 1 is formed by foaming molding in the mold. Thus, the respective holding portions 22, 32 are bonded to the cover body 1, and are made integral therewith.

In accordance with the thus constructed soundproofing cover of Example No. 1, the rigidity of the cover body 1 is enhanced at one of the opposite ends by the commonly-shared holding portion 32 of the datum bracket 3. Hence, it is easy to deal with the soundproofing cover. In addition, the volume of the commonly-shared holding portion 32 is small, and accordingly the increment of the weight is small as well.

When fastening this soundproofing cover to an engine, a pair of the installation portions 31 of the datum bracket 3 are fastened to the upper parts of the engine, respectively. Thus, the installation portions 21 of the independent brackets 2 are fastened to the lower parts of the engine, respectively. In this fastening, a pair of the installation portions 31 of the datum bracket 3 are first fastened to the upper parts of the engine by a bolt, respectively. Since the upper side of the cover body 1 is enhanced in terms of the rigidity by the commonly-shared holding portion 31 of the datum bracket 3, the soundproofing cover can be readily positioned with respect to the engine-side installation portions, and it can be installed thereto with high accuracy.

Subsequently, the independent brackets 2 are fastened. Note that the cover body 1 is put into a state that the upper side is fastened and the rest of the cover body 1 is hung down from the upper side. Accordingly, the datum bracket 3 becomes a datum, and the positions of the installation portions 21 of the independent brackets 2 are determined naturally. Thus, the installation portions 21 of the independent brackets 2 can be readily fastened to the engine-side installation portions. Even if the dimensional accuracy is low and the positions of the installation portions 21 are deviated from the engine-side installation portions, the cover body 1, excepting the upper side, can be deformed flexibly. Consequently, by such a deformation, the installation portions 21 can be fastened to the engine-side installation portions with ease.

EXAMPLE NO. 2

Figure 6:
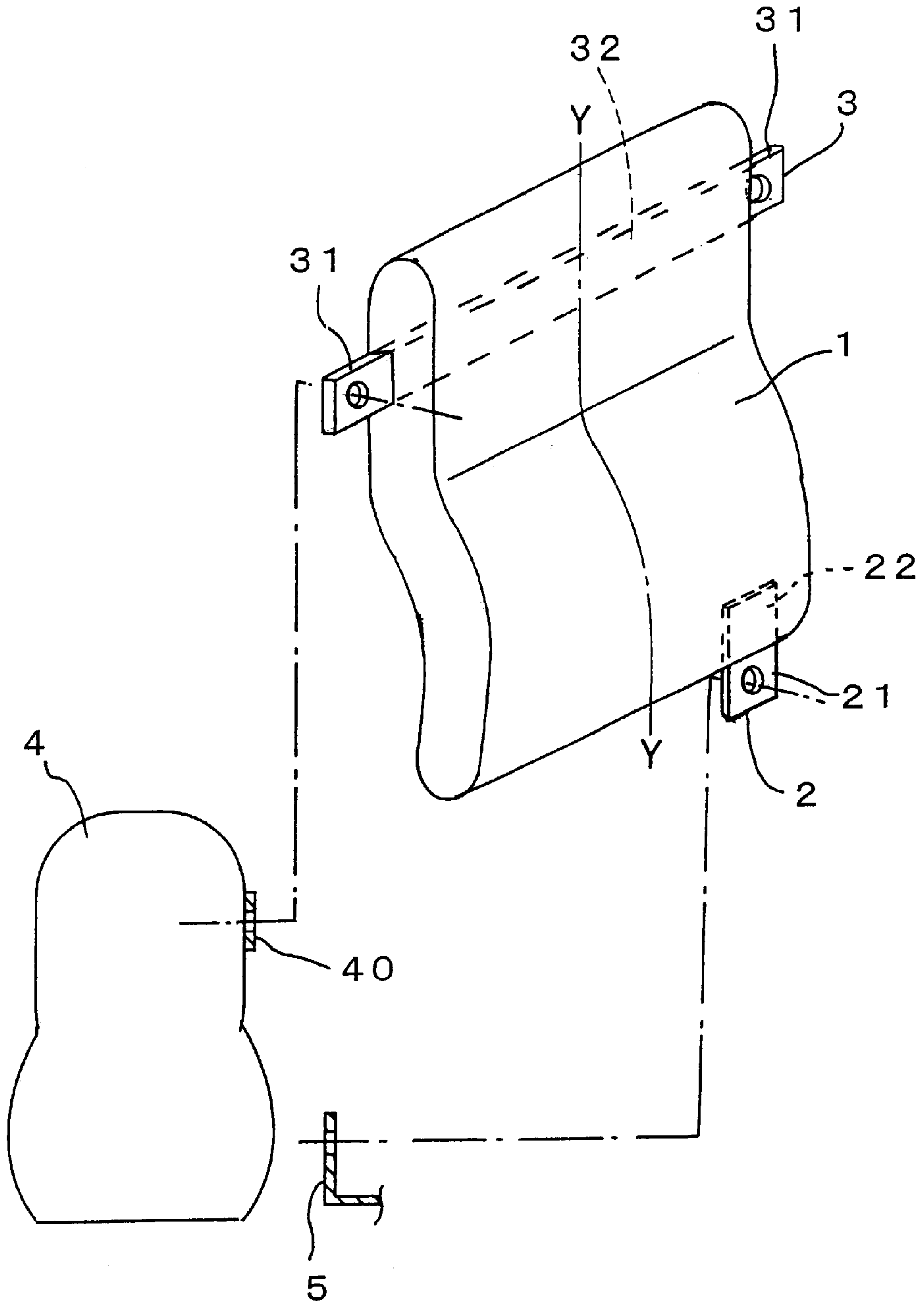
FIG. 6 is an explanatory diagram for illustrating Example No. 2 of a soundproofing cover according to the present invention together with portions to be installed thereto.

In FIG. 6, there is illustrated an explanatory diagram in which a soundproofing cover of Example No. 2 is about to be installed to vehicle-side installation portions. This soundproofing cover is substantially identical with that of Example No. 1, and comprises a cover body 1, an independent bracket 2 and a datum bracket 3. An installation portion 21 of the independent bracket 2 protrudes from the bottom end of the cover body 1. The datum bracket 3 is buried in the cover body 1 so that a commonly-shared holding portion 32 runs along the upper side of the cover body 1, and so that it crosses the center line "Y"—"Y", which extends in the top-and-bottom direction in FIG. 6. A pair of installation portions 31 protrude from the cover body 1 in the right-and-left direction, respectively.

The soundproofing cover of Example No. 2 is fastened to a vehicle in the following manner. A pair of the installation portions 31 of the datum bracket 3 are fastened to a pair of brackets 40 (the vehicle-side installation portions) of the engine 4 by a bolt. The installation portion 21 of the independent bracket 2 is fastened to an installation bracket 5 (the vehicle-side installation portion), which extends from a radiator (not shown), by a bolt.

When installing the soundproofing cover of Example No. 2, a pair of the installation portions 31 of the datum bracket 3 are first fastened to a pair of the brackets 40 of the engine 4. A pair of the brackets 40 are formed on the surface of the engine 4. Accordingly, by coinciding the dimensions of the datum bracket 3 with the dimensions of a pair of the brackets 40 with high accuracy, the datum bracket 3 can be fastened to the engine 4 with good positioning accuracy. Hence, the operability is good in the fastening as well.

Under the circumstances, the upper side of the cover body 1 is fastened to the engine 4, and the rest of the cover body 1 is hung down from the upper side. Then, the installation portion 21 of the independent bracket 2 is fastened to the installation bracket 5. Since the installation bracket 5 is fastened to the radiator, which is a separate component member disposed independently of the engine 4, there may arise a case that the engine 4 and the radiator are deviated positionally when the radiator is installed in the engine room.

However, in the soundproofing cover of Example No. 2, since only the cover body 1 is present between the independent bracket 2 and the datum bracket 3, and since it is made from a urethane foamed substance, it is full of softness so that it can deform flexibly. Accordingly, under the circumstances that the rest of the cover body 1 is hung down from the upper side thereof, even when there arises the positional deviation between the installation portion 21 of the independent bracket 2 and the installation bracket 5, the positional deviation can be readily corrected by deforming the cover body 1. Hence, the installation portion 21 can be fastened to the installation bracket 5 with ease.

Having now fully described the present invention, it will be apparent to one of ordinary skill in the art that many changes and modifications can be made thereto without departing from the spirit or scope of the present invention as set forth herein including the appended claims.

What is claimed is:

1. A soundproofing cover for a vehicle for absorbing noises produced by the vehicle, the soundproofing cover fastened to a plurality of portions of the vehicle, and the soundproofing cover comprising:

a cover body composed of a polymer foamed substance;

a plurality of brackets held integrally to said cover body; and the respective brackets having an installation portion to be fastened to the portions of the vehicle and holding portion held and fastened integrally to said cover body, and at least two of the installation portions connected by one of the holding portions shared commonly constituting a datum bracket, wherein the holding portions are buried in said cover body.

2. The soundproofing cover for a vehicle according to claim 1, wherein the vehicle has a plurality of mating surfaces to which said installation portions are fastened, and at least two of the installation portions are fastened on a single mating surface.

3. The soundproofing cover for a vehicle according to claim 1, wherein the holding portion of the datum bracket crosses the center line of said cover body.

4. The soundproofing cover for a vehicle according to claim 1, wherein said respective brackets, excepting the datum bracket, are disposed independently of each other.

5. The soundproofing cover for a vehicle according to claim 2, wherein the mating surfaces are formed as a three dimensional configuration.

6. The soundproofing cover for a vehicle according to claim 5, wherein the mating surfaces are formed on a plurality of separated mating members.

* * * * *